(12) United States Patent
Vaden

(10) Patent No.: US 10,102,052 B2
(45) Date of Patent: Oct. 16, 2018

(54) DUMPING RESOURCES

(71) Applicant: Hewlett Packard Enterprise Development LP, Houston, TX (US)

(72) Inventor: Thomas L. Vaden, Neshanic Station, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 149 days.

(21) Appl. No.: 15/114,362

(22) PCT Filed: Jan. 29, 2014

(86) PCT No.: PCT/US2014/013534
§ 371 (c)(1),
(2) Date: Jul. 26, 2016

(87) PCT Pub. No.: WO2015/116057
PCT Pub. Date: Aug. 6, 2015

(65) Prior Publication Data
US 2017/0010935 A1    Jan. 12, 2017

(51) Int. Cl.
*G06F 11/07* (2006.01)
(52) U.S. Cl.
CPC ...... *G06F 11/0778* (2013.01); *G06F 11/0706* (2013.01)
(58) Field of Classification Search
CPC .................................................. G06F 11/0778
USPC ............................................ 714/38.1, 38.11
See application file for complete search history.

(56) References Cited

U.S. PATENT DOCUMENTS

| 6,687,799 | B2 | 2/2004 | Smullen et al. |
| 6,728,907 | B1 | 4/2004 | Wang et al. |
| 6,944,722 | B2 | 9/2005 | Cantrill |
| 7,484,127 | B2 | 1/2009 | Babu |
| 7,509,521 | B2 | 3/2009 | Iwakura et al. |
| 7,685,575 | B1 * | 3/2010 | Fareed ................ G06F 11/0715 714/37 |
| 7,882,223 | B2 | 2/2011 | Brahmavar |
| 9,092,453 | B2 * | 7/2015 | Tsukamoto ......... G06F 11/3024 |
| 2005/0240806 | A1 | 10/2005 | Bruckert et al. |
| 2009/0063651 | A1 * | 3/2009 | Brahmavar ......... G06F 11/0709 709/212 |
| 2012/0179936 | A1 * | 7/2012 | Masser ............... G06F 11/0709 714/38.11 |
| 2013/0238884 | A1 | 9/2013 | Musha et al. |
| 2013/0282951 | A1 | 10/2013 | Kuo et al. |
| 2013/0346369 | A1 | 12/2013 | Kondou et al. |

OTHER PUBLICATIONS

Consigli, F. et al.; RAM Characteristics Exploration with an MVEDR Model, Oct. 12, 2010, 8 Pgs.
International Searching Authority, The International Search Report and the Written Opinion, dated Sep. 30, 2014, 10 Pages.

* cited by examiner

*Primary Examiner* — Joseph R Kudirka
(74) *Attorney, Agent, or Firm* — Brooks, Cameron & Huebsch, PLLC

(57) ABSTRACT

Dumping resources can include identifying a resource associated with a computing device, dumping the resource associated with the computing device, determining whether the resource has changed since the resource has been dumped, and dumping the resource, prior to a crash of the computing device occurring, when the resource has changed since the last dump.

18 Claims, 3 Drawing Sheets

DUMPING RESOURCES

BACKGROUND

A computing device can execute instructions contained in application programs to perform various tasks. The application programs can make use of an operating system associated with the computing device by making requests for services (e.g., processor services, memory services) through a defined application program interface. However, in some examples, a failure of an application program, operating system, or hardware (e.g., hard disk) can cause the computing device to crash.

DETAILED DESCRIPTION

Figure 1:
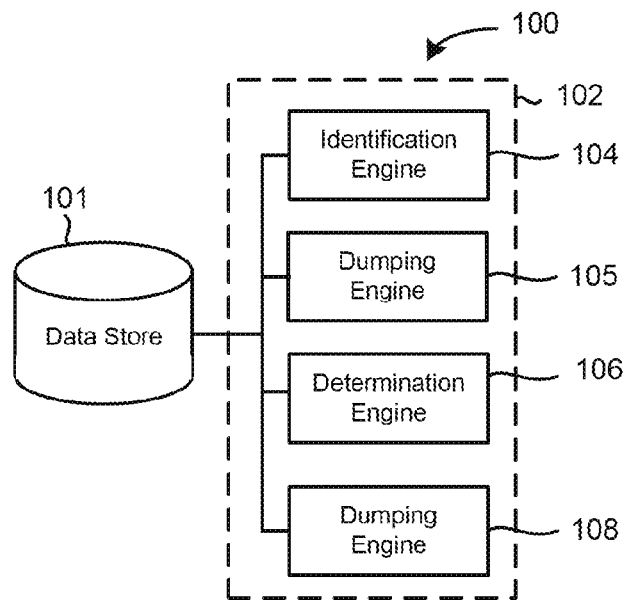
FIG. 1 illustrates a diagram of an example of a system for dumping resources according to the present disclosure.

When an application program, operating system, and/or hardware associated with a computing device fails, the computing device can crash, which can be defined as when the computing device ceases to function properly. In some examples, a responsible application program may appear to freeze until a crash reporting service documents details of the crash. If the application program is a critical part of the operating system, the entire computer may crash, which can cause a fatal system error, causing the computing device to freeze or cease to function properly. The application program and/or computing device may freeze or cease to function properly until a reporting service documents details associated with the crash.

In some examples, the reporting service can record (e.g., make a copy of) system state information and/or memory with a recording device. The recorded information can be analyzed to determine a cause of the crash. However, a portion of the system state information and/or memory can be static when a crash occurs. For example, the static portion of the system state information and/or memory may not be involved with a cause of the crash. In some examples, the resource can be static when the resource is not being used and/or has not changed within a defined period of time. Recording the static information with the recording device may therefore only increase a time that recording the system state information and memory takes, without providing further insight into a source of the crash.

In addition, after a computing device crashes, the computing device may perform a process that dumps system state information and/or memory, prior to restarting the computing device. A time associated with this process, however, can be excessive when a size of the computing device is large and/or the computing device is a part of a large computing system. The amount of state information and/or memory to be dumped in a large computing device and/or computing system can be associated with a greater dumping time. For example, in a system with 100s or 1000s of processors or 10s or 100s of Terabytes of memory, a post-crash recovery time can be prohibitive even when strategies of careful data selection, data compression, parallel processing, and/or multi-path I/O strategies are employed.

In contrast, dumping resources according to the present disclosure can provide for a reduced time associated with recording the system state information and/or memory and a reduced time associated with dumping the system state information and/or memory by dumping resources (e.g., system state information, memory) prior to the crash of the computing device occurring. In some examples, an identification engine can identify a resource associated with a computing device. In some examples of the present disclosure, a dumping engine can dump the resource associated with the computing device. In some examples of the present disclosure, a determination engine can determine whether the dumped resource has changed since the resource has been dumped. In some examples of the present disclosure, the dumping engine can dump the resource, prior to a crash of the computing device occurring, when the resource has changed since the last dump.

FIG. 1 illustrates a diagram of an example of a system 100 for dumping resources according to the present disclosure. The system 100 can include a data store 101, dumping resources system 102, and/or a number of engines 104, 105, 106, and 108. As used herein, "a number of" an element and/or feature can refer to one or more of such elements and/or features.

The dumping resources system 102 can include a controller in some examples (not illustrated in FIG. 1), which can be in communication with the data store 101 via a communication link, and can include the number of engines (e.g., identification engine 104, dumping engine 105, determination engine 106, and dumping engine 108). In some examples, system 100 can include a number of applications that can, in some examples, be managed by the controller. The dumping resources system 102 can include additional or fewer engines than illustrated to perform the various functions described herein.

The number of engines 104, 105, 106, and 108 can include a combination of hardware and programming that is configured to perform a number of functions described herein (e.g., dumping resources). The programming can include program instructions (e.g., software, firmware, etc.) stored in a memory resource (e.g., computer readable medium (CRM), machine readable medium (MRM), etc.) as well as hard-wired program (e.g., logic).

The identification engine 104 can include a combination of hardware and programming to identify a resource associated with a computing device. The resource can include, in some examples, system state information associated with the computing device and/or memory associated with the computing device. State information can include, for example, stored information at a given instant in time, to which a circuit associated with the computing device and/or an application program running on the computing device has access. Memory can include, for example, data on a temporary and/or permanent basis for use in the computing device.

In some examples, the identification engine 104 can identify the resource associated with the computing device by passing the resource through a filter. For example, the system 100 can include a filtering engine to filter the resource associated with the computing device prior to dumping the resource. For example, by passing the resource through the filter, the resource can be identified based on a type of resource. The filter can be applied through use of idle resources associated with the computing device. For example, when additional memory resources and/or processing resources are available, the additional memory resources and/or processing resources can be used to apply the filter to identify the resource associated with the computing device.

In some examples, identification of the resource associated with the computer can be performed when processing usage and/or memory usage of the computer is below a defined level. As such, when the processing usage and/or memory usage of the computer is below a defined level, the resource associated with the computer can be identified without a noticeable decrease in performance (e.g., speed) of the computing device. In some examples of the present disclosure, the identification of the resource associated with the computer with the idle resource can be delayed when the processing usage of the computer is above a defined level.

The dumping engine 105 can include a combination of hardware and programming to dump a resource associated with a computing device. In some examples, the dumping engine 105 can dump the resource associated with the computing device when it passes through the filter. In an example, when the resource is memory, the filter can identify a type associated with the memory. As such, the filter can identify if the memory is kernel memory, which can be dumped by the dumping engine 105. Alternatively, if the memory includes an application memory, the memory may not pass through the filter.

The determination engine 106 can include a combination of hardware and programming to determine whether the dumped resource has changed since the resource has been dumped. If the resource has not changed, for example, the resource can be static because the resource is not being used and/or has not changed within a defined period of time.

Examples of the present disclosure can use idle resources to determine whether the dumped resource has changed since the resource has been dumped. As such, the determination of whether the dumped resource has changed since the resource has been dumped can be performed when processing usage and/or memory usage of the computer is below a defined level, for example, when idle resources are available. As discussed herein, when the processing usage and/or memory usage of the computer is below a defined level, the determination of whether the dumped resource has changed since the resource has been dumped can be made without a noticeable decrease in performance (e.g., speed) of the computing device.

In some examples, the determination, with the idle resource, of whether the memory and/or system state information associated with the computer has changed since the memory and/or system state information has been dumped can be delayed, when the processing usage and/or memory usage of the computer is above a defined level. Processing usage and/or memory usage of the computer above a defined level can indicate that a minimal amount of idle resources are available for determining whether memory and/or system state information associated with the computer has changed since the memory and/or system state information has been dumped. As such, by delaying the determination of whether the memory and/or system state information associated with the computer has changed until idle resources are available (e.g., processing usage and/or memory usage of the computer is below a defined level), performance of the computing device may not be decreased.

The dumping engine 108 can include a combination of hardware and programming to dump the resource, prior to a crash of the computing device occurring, when the resource has changed since the last dump. The dumping engine 108 can be the same as dumping engine 105 or can be different than dumping engine 105. As discussed herein, in the event of a crash, the computing device may perform a process that dumps system state information and/or memory, prior to restarting the computing device. Previous methods have performed a dump of both static and non-static resources (e.g., system state information and/or memory that is being used and/or has changed within a defined period of time), after the crash has occurred and prior to restarting the computing device. However, dumping both the static and non-static resources can result in an increased time associated with the dump. Examples of the present disclosure can dump resources that have changed since the resources have been dumped prior to the crash, which can result in a decreased time associated with the dump.

In some examples, an identification of the resource dumped prior to the crash can be recorded. The identification of the resource dumped prior to the crash can be used to maintain a log of an amount of resources that have been dumped. For example, a user may access the log to determine a percentage of resources that have been dumped and/or determine a percentage of resources that have not been dumped. Alternatively, when the resource is dumped, the identification of the resource can be used to monitor if the resource has changed (e.g., become non-static), such that the resource can be dumped again.

In some examples, a determination of whether the resource has changed after the resource has been dumped can be made. The determination of whether the resource has changed after the resource has been dumped can include a determination of whether the resource is now being used and/or has changed within a defined period of time. If the resource is now being used and/or has changed within a defined period of time (e.g., the resource has changed), the resource can be dumped a second time prior to the crash. As such, the resource can be continually monitored to determine whether the resource has changed since the resource has been dumped. When the resource has changed since the resource has been dumped, the resource can be dumped prior to the crash, as discussed herein.

Figure 2:
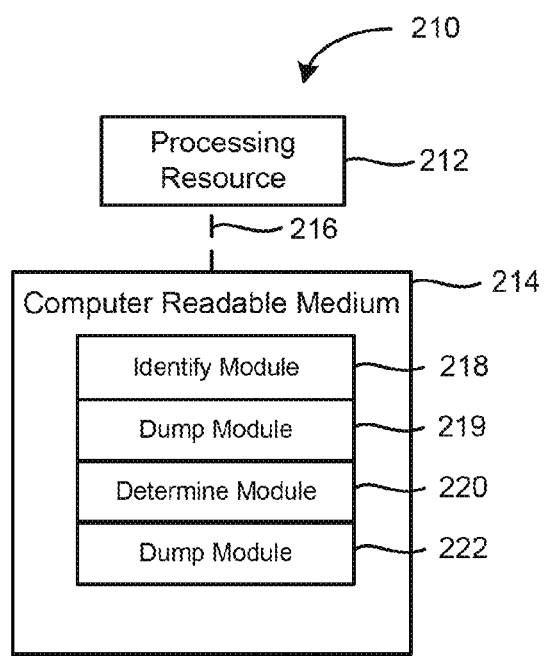
FIG. 2 illustrates a diagram of an example computing device according to the present disclosure.

FIG. 2 illustrates a diagram of an example computing device 210 according to the present disclosure. The computing device 210 can utilize software, hardware, firmware, and/or logic to perform a number of functions described herein.

The computing device 210 can be any combination of hardware and program instructions configured to share information. The hardware, for example can include a processing resource 212 and/or a memory resource 214 (e.g., CRM, MRM, database, etc.). A processing resource 212, as used herein, can include any number of processors capable of executing instructions stored by a memory resource 214. Processing resource 212 may be integrated in a single device or distributed across multiple devices. The program instructions (e.g., computer-readable instructions (CRI)) can include instructions stored on the memory resource 214 and executable by the processing resource 212 to implement a desired function (e.g., dumping resources).

The memory resource 214 can be in communication with a processing resource 212. A memory resource 214, as used herein, can include any number of memory components capable of storing instructions that can be executed by processing resource 212. Such memory resource 214 can include a non-transitory CRM or MRM. Memory resource 214 may be integrated in a single device or distributed across multiple devices. Further, memory resource 214 may be fully or partially integrated in the same device as processing resource 212, or it may be separate but accessible to that device and processing resource 212. Thus, it is noted that the computing device 210 may be implemented on a participant device, on a server device, on a collection of server devices, and/or a combination of the user device and the server device.

The memory resource 214 can be in communication with the processing resource 212 via a communication link (e.g., a path) 216. The communication link 216 can be local or remote to a machine (e.g., a computing device) associated with the processing resource 212. Examples of a local communication link 216 can include an electronic bus internal to a machine (e.g., a computing device) where the memory resource 214 is one of volatile, non-volatile, fixed, and/or removable storage medium in communication with the processing resource 212 via the electronic bus.

A number of modules 218, 219, 220, 222 can include CRI that when executed by the processing resource 212 can perform a number of functions. The number of modules 218, 219, 220, 222 can be sub-modules of other modules. For example, the identify module 218, the dump module 219, the determine module 220, and the dump module 222 can be sub-modules and/or contained within the same computing device. In another example, the number of modules 218, 219, 220, 222 can comprise individual modules at separate and distinct locations (e.g., CRM, etc.).

Each of the number of modules 218, 219, 220, 222 can include instructions that when executed by the processing resource 212 can function as a corresponding engine as described herein. For example, the identify module 218 can include instructions that when executed by the processing resource 212 can function as the identify engine 104. In another example, the dump module 219 can include instructions that when executed by the processing resource 212 can function as the dump engine 105. In another example, the determine module 220 can include instructions that when executed by the processing resource 212 can function as the determination engine 106. In another example, the dump module 222 can include instructions that when executed by the processing resource 212 can function as the dumping engine 108.

Figure 3:
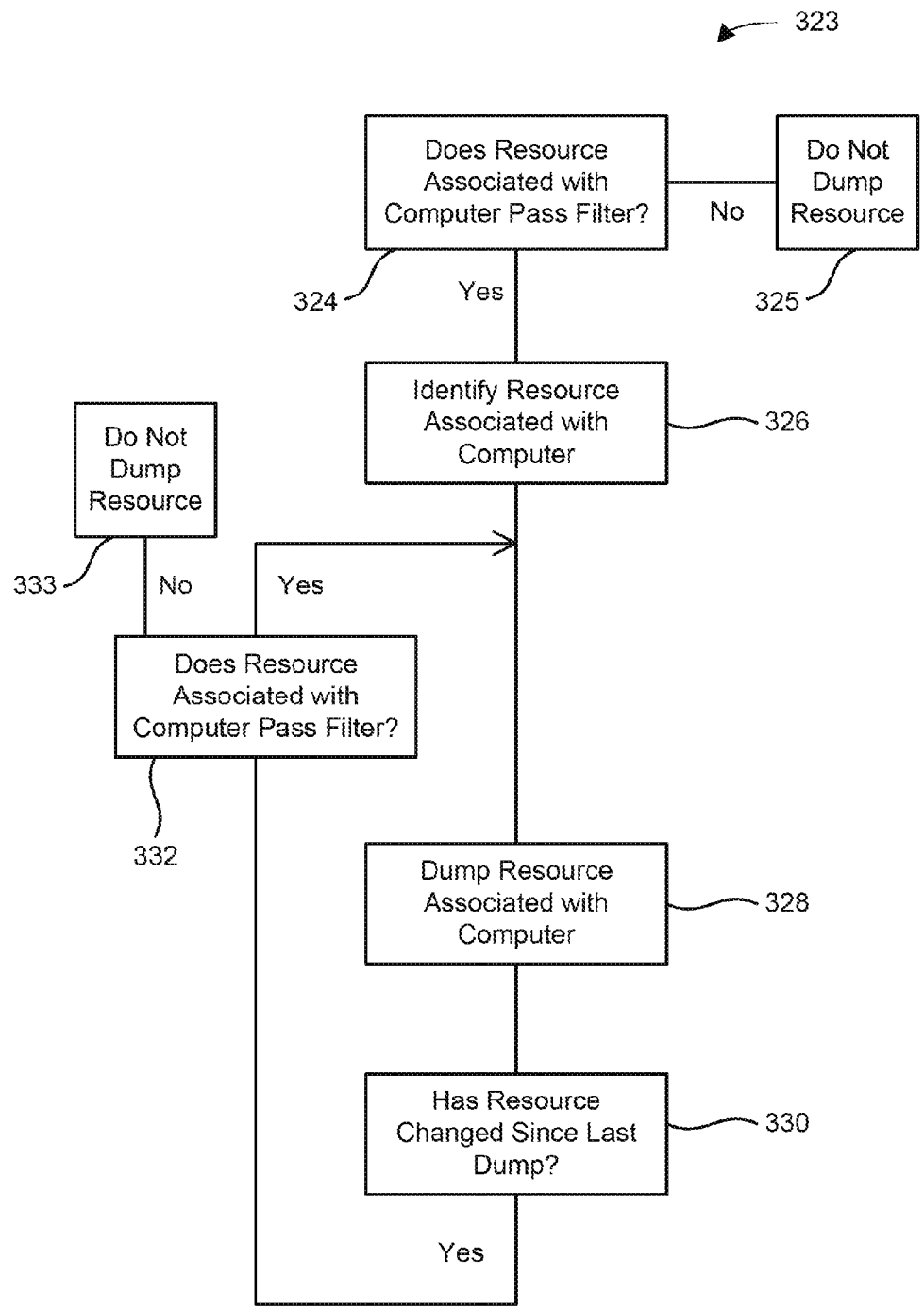
FIG. 3 illustrates a flow chart of an example of a method for dumping resources according to the present disclosure.

FIG. 3 illustrates a flow chart of an example of a method 323 for dumping resources according to the present disclosure. At 324, a filter can be applied and a determination of whether a resource associated with a computer passes through the filter can be made. The filter can determine whether the resource is a type of resource that can be dumped. For example, the filter can determine if the resource is a kernel memory that can be dumped and/or the filter can determine if the resource is application memory, which is not dumped. If the resource does not pass through the filter, the resource may not be dumped, as indicated at 325.

At 326, the resource associated with the computer can be identified. As discussed herein, the resource can include, in some examples, system state information associated with the computing device and/or memory associated with the computing device. In some examples, the resource associated with the computing device can be identified by passing the resource through a filter. For example, by passing the resource through the filter, the resource can be identified based on a type of resource. The filter can be applied through use of idle resources associated with the computing device.

At 328, the resource associated with the computer can be dumped when the resource passes the filter, indicating that the resource is a type of resource that can be dumped. For example, when the resource passes the filter, the resource can be a resource such as kernel memory and can be dumped. Alternatively, if the resource does not pass the resource, at 325, the resource may not be dumped.

At 330, a determination of whether the resource has changed since the resource was last dumped can be made. For example, if the resource has changed, the resource may be non-static and the resource can be dumped. If the resource has changed, the method can loop and once again dump the resource, at 328. In some examples, however, an additional filtering step can be included prior dumping the resource, at 328, to determine a type associated with the resource.

In some examples, at 332, a determination can be made of whether the resource associated with the computer passes through a filter. As discussed in relation to 324 a filter can be applied to determine whether the resource is a type of resource that can be dumped. A resource may not be static and, as a result, may change when the computer runs. For example, a memory may be used for a different task and it may not be desirable to dump the memory. As such, if the resource does not pass the filter at 332, the resource is not dumped, at 333. However, if the resource does pass the filter at 332 and the method 323 can loop and the resource associated with the computer can again be dumped at 328. In some examples, determining whether the resource associated with the computer has changed since the last dump at 330 and determining whether the resource associated with the computer passes the filter at 332 can be performed in either order.

Figure 4:
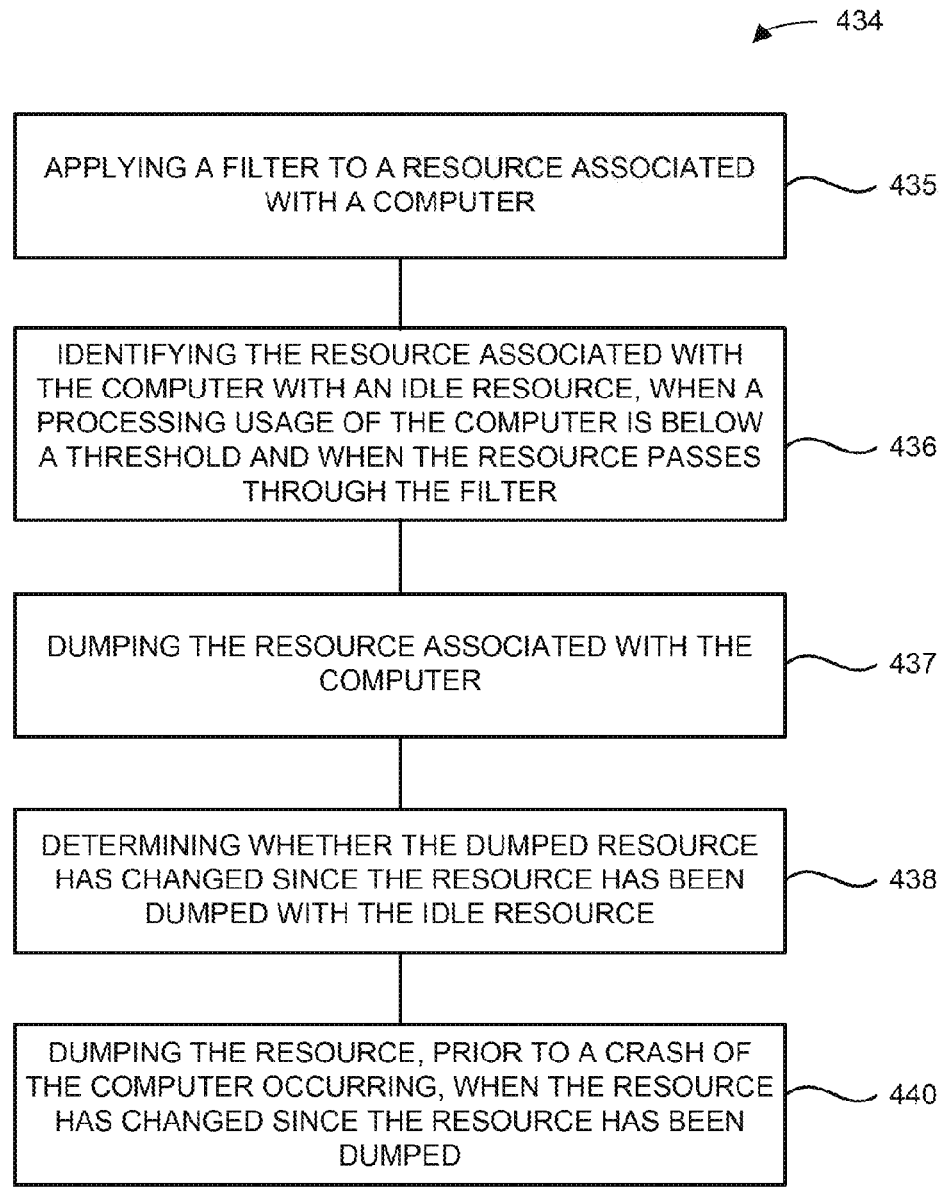
FIG. 4 illustrates a flow chart of an example of a method for dumping resources according to the present disclosure.

FIG. 4 illustrates a flow chart of an example of a method 434 for dumping resources according to the present disclosure. At 435, the method can include applying a filter to a resource associated with a computer. The filter can be applied to the resource to determine a type associated with the resource. In an example, when the resource is kernel memory, the resource can pass through the filter. Alternatively, when the resource is application memory, the resource may not pass through the filter and may not be subsequently dumped.

At 436, the method can include identifying a resource associated with the computer with an idle resource, when a processing usage of the computer is below a threshold and when the resource passes through the filter. The resource associated with the computer can include system state information and/or a memory associated with the computing device. In some examples, the resource associated with the computer can be identified when a memory usage of the computer is below a threshold. As such, performance of the computing device may be preserved by using idle resources to identify the resource associated with the computer.

At 437, the method can include dumping the resource associated with the computer. In an example, the resource can be dumped when the resource has passed through the applied filter and thus has been identified as a resource that can be dumped.

At 438, the method can include determining whether the dumped resource has changed since the resource has been dumped with the idle resource. When the resource is has changed since the resource has been dumped, the resource may have been used and/or may have changed within a defined period of time (e.g., non-static). In some examples, the idle resource may not currently be used for performance of a task performed by the computing device. As such, the task performed by the computing device may not be affected by a decreased performance of the computing device, because the resource may not be used for performance of the task.

The method can include selecting the idle resource from a number of idle resources that have different priorities. Idle resources that have a priority that is below a defined level can be selected. As such, idle resources that have a higher priority can be used for other tasks performed by the computing device (e.g., tasks that require a greater percentage of resources for performance of the task).

At 440, the method includes dumping the resource, prior to a crash of the computer occurring, when the resource has changed since the resource has been dumped. Dumping the resource prior to the crash may result in less time associated with dumping resources after the crash, because a number of resources may have already been dumped. As such, the method can include dumping a remaining number of resources after the crash of the computer. The remaining number of resources may include resources that are mostly non-static, since static resources may have been previously dumped.

The method can include making a copy of a remaining number of resources after the crash of the computer with a recording device. The majority of the remaining resources after the crash of the computer may include resources that are non-static, since a number of static resources have been dumped. As a result, the copy of the remaining number of resources may be made in less time than if the static resources had not been dumped, because fewer overall resources will be copied by the recording device because a number of static resources have been dumped. In some examples, the copy of the remaining resources can then be analyzed to determine a cause of the crash. The analysis of the remaining resources may also be made in less time because the analysis will not include static resources that have been dumped.

In the preceding detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A system, comprising:
   an identification engine to identify a resource associated with a computing device;
   a dumping engine to perform a first dump of the resource associated with the computing device;
   a determination engine to use an idle resource to determine whether the dumped resource has changed since the resource has been dumped; and
   the dumping engine to perform a second dump of the resource, prior to a crash of the computing device occurring, in response to the resource having changed since the resource has been dumped.

2. The system of claim 1, wherein the resource is system state information associated with the computing device.

3. The system of claim 1, wherein the resource is a memory associated with the computing device.

4. The system of claim 1, including the identification engine to record an identification of the resource dumped prior to the crash.

5. The system of claim 1, including a filtering engine to filter the resource associated with the computing device prior to the first dump of the resource.

6. The system of claim 5, including the dumping engine to perform the first dump of the resource associated with the computing device when the resource passes through the filter.

7. The system of claim 1, including the dumping engine to dump a remaining number of resources after the crash of the computing device.

8. The system of claim 1, wherein the idle resource is selected from a number of idle resources that have different priorities, wherein the idle resource has a priority that is below a defined level.

9. A non-transitory computer readable medium storing instructions executable by a processing resource to cause a computer to:
   identify, with an idle resource, a memory associated with the computer in response to a processing usage of the computer being below a defined level;
   dumping the memory associated with the computer;
   determine, with the idle resource, whether the dumped memory has changed since the memory has been dumped; and
   dump the memory, prior to a crash of the computer occurring, when the memory has changed since the memory has been dumped.

10. The non-transitory computer readable medium of claim 9, wherein the instructions are executable to delay, with the idle resource, an identification of the memory associated with the computer, in response to the processing usage of the computer being above a defined level.

11. The non-transitory computer readable medium of claim 9, wherein the instructions are executable to determine, with the idle resource, whether the memory has changed since the memory has been dumped, in response to the processing usage of the computer being below a defined level.

12. The non-transitory computer readable medium of claim 11, wherein the instructions are executable to delay, with the idle resource, the determination of whether the memory associated with the computer has changed since the memory has been dumped, in response to the processing usage of the computer being above a defined level.

13. The non-transitory computer readable medium of claim 9, wherein the instructions are executable to dump a remaining number of resources after the crash of the computer.

14. The non-transitory computer readable medium of claim 9, wherein the instructions are executable to select the idle resource from a number of idle resources that have different priorities, wherein the idle resource has a priority that is below a defined level.

15. A method for dumping resources, comprising:
applying a filter to a resource associated with a computer;
identifying, with an idle resource, the resource associated with the computer in response to a processing usage of the computer being below a threshold and in response to the resource passing through the filter;
dumping the resource associated with the computer;
determining, with the idle resource, whether the dumped resource has changed since the resource has been dumped; and
dumping the resource, prior to a crash of the computer occurring, in response to the resource being changed since the resource has been dumped.

16. The method of claim 15, wherein the method includes dumping a remaining number of resources after the crash of the computer.

17. The method of claim 15, wherein the method includes making a copy of a remaining number of resources after the crash of the computer with a recording device.

18. The method of claim 15, wherein the method includes selecting the idle resource from a number of idle resources that have different priorities, wherein the idle resource has a priority that is below a defined level.

* * * * *